United States Patent [19]

Okayama et al.

[11] Patent Number: 4,866,254

[45] Date of Patent: Sep. 12, 1989

[54] AUTOMATIC BILL TRANSACTION SYSTEM

[75] Inventors: Masao Okayama, Ryugasaki; Masataka Kawauchi, Ishioka; Hideo Iwakami, Hadano; Yasunori Hamada, Tsuchiura, all of Japan

[73] Assignee: Hitachi, Ltd., Tokyo, Japan

[21] Appl. No.: 893,157

[22] Filed: Aug. 5, 1986

[30] Foreign Application Priority Data

| | | | |
|---|---|---|---|
| Aug. 9, 1985 | [JP] | Japan | 60-174102 |
| May 23, 1986 | [JP] | Japan | 61-117328 |
| May 23, 1986 | [JP] | Japan | 61-117329 |
| May 23, 1986 | [JP] | Japan | 61-117330 |

[51] Int. Cl.[4] .......... G06F 15/30

[52] U.S. Cl. .......... 235/379; 902/12; 902/17; 271/9; 209/534

[58] Field of Search .......... 235/379, 375, 376, 381, 235/380, 383; 364/401, 408; 209/534; 194/206; 271/9; 902/12–15, 17, 10

[56] References Cited

U.S. PATENT DOCUMENTS

| | | | |
|---|---|---|---|
| 4,355,369 | 10/1982 | Garvin | 235/379 |
| 4,417,137 | 11/1983 | Lundblad | 235/375 |
| 4,511,133 | 4/1985 | Kokubo et al. | 271/9 |
| 4,511,794 | 4/1985 | Imamichi | 235/379 |
| 4,511,795 | 4/1985 | Wood et al. | 235/375 |
| 4,524,268 | 6/1985 | Fukatsu | 235/379 |
| 4,546,240 | 10/1985 | Imamichi | 235/379 |
| 4,575,816 | 3/1986 | Hendrickson et al. | 235/379 |
| 4,620,087 | 10/1986 | Aizaki | 235/379 |
| 4,636,947 | 1/1987 | Ward | 235/379 |
| 4,639,889 | 1/1987 | Matsumoto et al. | 235/379 |
| 4,697,708 | 10/1987 | Goto et al. | 235/379 |
| 4,744,468 | 5/1988 | Goi et al. | 235/379 |
| 4,775,783 | 10/1988 | Sasaki et al. | 235/379 |

*Primary Examiner*—Alan Faber

*Assistant Examiner*—Robert A. Weinhardt

*Attorney, Agent, or Firm*—Antonelli, Terry & Wands

[57] ABSTRACT

A plurality of transaction machines constituting a transaction system is provided with a bill exchange device which exchanges bills individually among the transaction machines.

13 Claims, 12 Drawing Sheets

AUTOMATIC BILL TRANSACTION SYSTEM

BACKGROUND OF THE INVENTION

The present invention relates to a transaction system which incorporates a plurality of transaction machines capable of accepting deposits from and paying out money to customers, and more particularly, to a transaction system which allows bills to be circulated among a plurality of transaction machines constituting a transaction system to be used for payment.

Cash transaction handling machines operated by a teller have been installed at bank counters so as to increase the efficiency of counter transactions in banks. On the other hand, there are cash corners in banks in which transaction systems are installed. Such transaction systems are composed of a plurality of transaction machines capable of accepting deposits from and paying out money to customers, such as that disclosed in the specification of U.S. Pat. No. 4,511,133, and are operated by customers directly.

In cash corners, some of the plurality of transaction machines described above may be used by customers very often, while others utilized less frequently. The contents of the transactions conducted by individual transaction machines may also differ. Transaction machines, if very frequently utilized by customers for deposit accepting, become full of bills, whereas transaction machines used mainly for payment contain insufficient bills. In such a case, operation of transaction machines has to be suspended while bills are supplied to or retrieved from the transaction machines by an operator.

SUMMARY OF THE INVENTION

Accordingly, an object of the present invention is to provide a transaction system which enables the bills to be circulated among its transaction machines.

Another object of the present invention is to provide a transaction system which allows efficiency of the use of funds among transaction machines to be increased.

To achieve these objects of the present invention, a plurality of transaction machines constituting the transaction system have bill exchange means for exchanging bills among the transaction machines.

The bill exchange means is adapted to convey surplus bills of a transaction machine to any other transaction machines, which require them, in a state wherein they are separated one by one, thereby supplying bills thereto.

The above and other objects, features and advantages of the invention will become clear from the following description of the preferred embodiments taken in conjunction with the accompanying drawings.

DETAILED DESCRIPTION OF THE PREFERRED EMBODIMENTS

Embodiments of the present invention will be described hereinunder with reference to the accompanying drawings.

Figure 1:
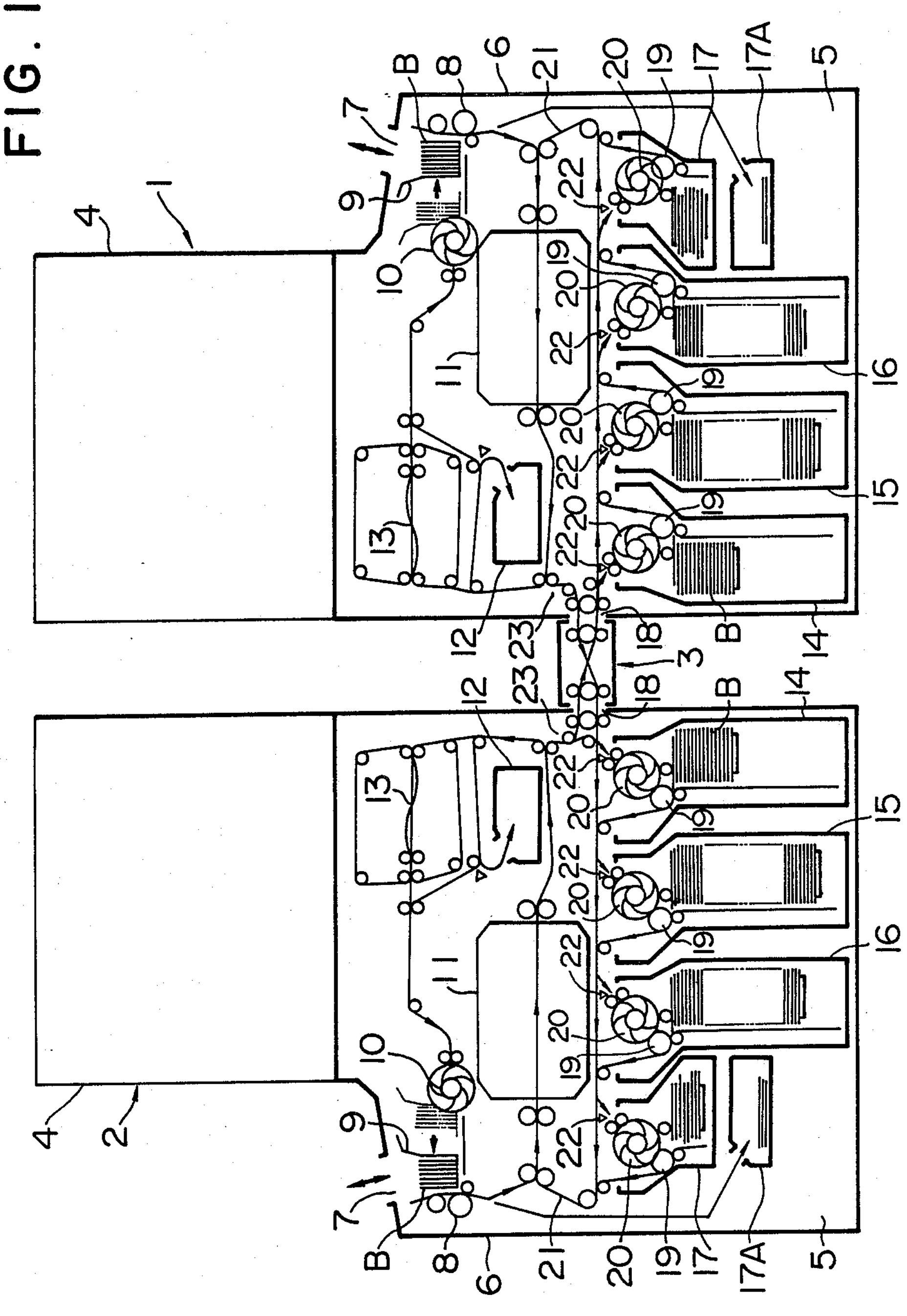
FIG. 1 shows the construction of a first embodiment of a transaction system according to the present invention.

Referring first to FIG. 1 which shows a first embodiment of a transaction system of the present invention, reference numerals 1 and 2 denote transaction machines capable of accepting deposits and paying out money. The transaction machines 1 and 2 are disposed such that back surfaces thereof are opposite to each other. The transaction machines 1 and 2 are connected with each other through a bill exchange device 3 which exchanges bills therebetween. The bill exchange device 3 is adapted to convey surplus bills of, for example, the transaction machine 1 to the other transaction machine 2 which requires them after the bills have been separated one by one in the transaction machine 1, thereby supplying the transaction machine 2 with bills B. Reversely, the bill exchange device 3 also can supply the bills B from the transaction machine 2 to the machine 1. The transaction machines 1 and 2 are each constructed with a slip and bankbook printing section 4 and a bill handling section 5. The bill handling section 5 has at the front side of its body 6 a port 7 through which bills are received and paid out. At one side of the port 7 is a separator 8 for accepting deposited bills B, and at the other side thereof is a pushing portion 9 for forcing out the bills B to be paid to the port 7. The pushing portion 9 is provided with an accumulator 10 for accumulating the bills B to be paid out. At the center of the body 6 is a discriminator 11 which discriminates the genuineness and number of bills B which have been received or will be paid out, or which will be supplied or have been retrieved. The bill handling section 5 also contains in its body 6 at the rear of the discriminator 11 a reject box 12 for retrieving the indiscriminatable bills. Above the reject box 12, i.e., at the rear and upper portion of the body 6 is a turning portion 13 for reversing the bills which have been placed face down. The bill handling section 5 further contains in the lower portion of its body 6 a bill box 14 for bills B, a first bill box 15 which contains bills to be circulated, a second bill box 16 which contains bills to be circulated, a pre-stacker 17 for temporarily storing received bills B, and a box 17A for retrieving bills which have been left behind, the box 17A being disposed below the pre-stacker 17. The bill boxes 14, 15 and 16 and the pre-stacker 17 are disposed in the body 6 from its rear side in this order. The bill box 14, the first bill box 15, the second bill box 16 and the pre-stacker 17 each have at their upper portions a separator 19 for separating bills B when they are discharged and an accumulator 20 for accumulating bills B. These components described above are interconnected through a conveying means 21 which has gates 22 at the junction thereof. Part of the conveying means 21 which is located between the bill box 14 and the reject box 12 constitutes a branch conveyor 23 through which bills are exchanged with another transaction machine. The branch conveyor 23 faces at the end thereof a window 18 provided at the rear side of the transaction machine 1.

Figure 2:
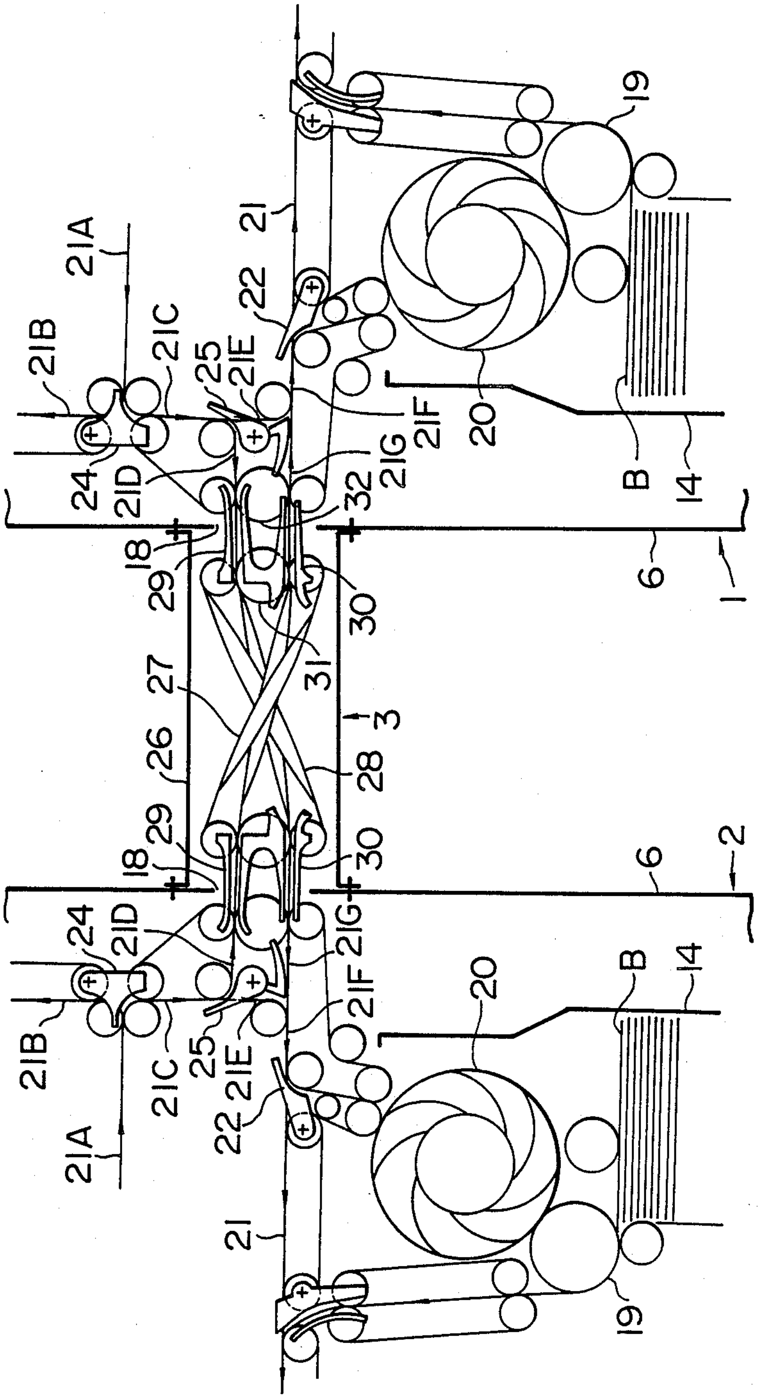
FIG. 2 shows in detail a bill exchange means employed in the transaction system of FIG. 1.

The branch conveyor 23, as shown in FIG. 2, includes: a first switch-over gate 24 by which the bills B which have been conveyed from the discriminator 11 through a conveying means 21A are switched over to either a conveying means 21B which leads to the turning portion 13 or a conveying means 21C which leads to the bill box 14; a second switch-over gate 25 by which the bills B which have been conveyed to the conveying means 21C by the first switch-over gate 24 are switched over to either a conveying means 21D which leads to the bill exchange device 3 or a conveying means 21E which leads to the bill box 14 and the first and second bill boxes 15 and 16; and a conveying means 21G which introduces the bills B which have been conveyed from the bill exchange device 3 to a conveying means 21F. The first and second switch-over gates 24, 25 are operated by drive means not shown.

Referring to FIG. 2, a body 26 of the bill exchange device 3 is secured to the windows 18 of the transaction machines 1 and 2 by means of bolts or the like. The bill exchange device 3 contains in its body 26 two conveying passages 27 and 28 through which the bills contained in either of the transaction machines 1 and 2 are conveyed to the other machine. The conveying passages 27 and 28 are crossed with each other so that bills B are conveyed from one transaction machine 1 to the other transaction machine 2, and also conveyed from the transaction machine 2 to the transaction machine 1. The conveying passages 27 and 28 are provided at both ends with first guides 29 and second guides 30, respectively, by which both ends of the conveying passages 27 and 28 are connected to the conveying means 21D and 21G of the transaction machines 1 and 2 through the windows 18. The conveying passages 27 and 28 may be driven by the engagement of gears for rollers 31 constituting the conveying passages 27 and 28 with those for rollers 32 constituting the conveying means 21D and 21G of the transaction machines 1 and 2.

Operation of the first embodiment of the transaction system according to the present invention will be described below.

The transaction machines 1 to 3 are each adapted to temporarily store bills B inserted into the port 7 by a customer in the pre-stacker 17, thereafter to classify them by the type of bill and to accommodate them in the bill boxes 15 and 16, thus conducting deposit accepting transactions. The transaction machines 1 and 2 also turn the bills B contained in the first and second bill boxes 15 and 16 with the turning portion 13 to set the bills in the same facing and discharge them to the port 7 to conduct paying transactions.

When the first and second bill boxes of any of the transaction machines 1 and 2 become full of bills B, or when the first and second bill boxes are short of bills B as a result of the transactions described above, the quantities of bills contained in the bill boxes are detected by sensors and any surplus bills B contained in the first and second bill boxes are separated one by one and accommodated in the bill box 14, or the bills B contained in the bill box 14 are supplied to the first and second bill boxes 15 and 16 to cope with the transactions conducted by customers.

Assume that as a result of transactions through the transaction machines 1 and 2, the transaction machine 1 contains a sufficient amount of bills and the transaction machine 2 is short of bills. The first and second gates 24 and 25 in the transaction machine 1 are switched over as shown by the solid line of FIG. 2. In consequence, surplus bills contained in the bill box 14, the first bill box 15 or the second bill box 16 in the transaction machine 1 are separated one by one by the separators 19, and are conveyed to the branch conveyor 23 through the discriminator 11. The bills are then conveyed to the conveying means 21D through the first and second gates 24 and 25, further conveyed to the transaction machine 2 through the first guide 29 of the bill exchange device 3, the conveying passage 28 and the second guide 30, and are conveyed through the conveying means 21G and 21F of the transaction machine 2 into the bill box 14, the first bill box 15 or the second bill box 16. In consequence, the transaction machine 2 has sufficient bills and is ready for transactions.

On the other hand, when the transaction machine 1 becomes short of bills, the bills contained in the transaction machine 2 are supplied to the transaction machine 1 in the same manner as described above.

According to the first embodiment of the present invention, bills can be circulated among the transaction machines. As a result, efficiency of the use of funds can be increased. Bills are conveyed between the transaction machines one by one, and this makes the construction of the conveying passages simpler.

Figure 3:
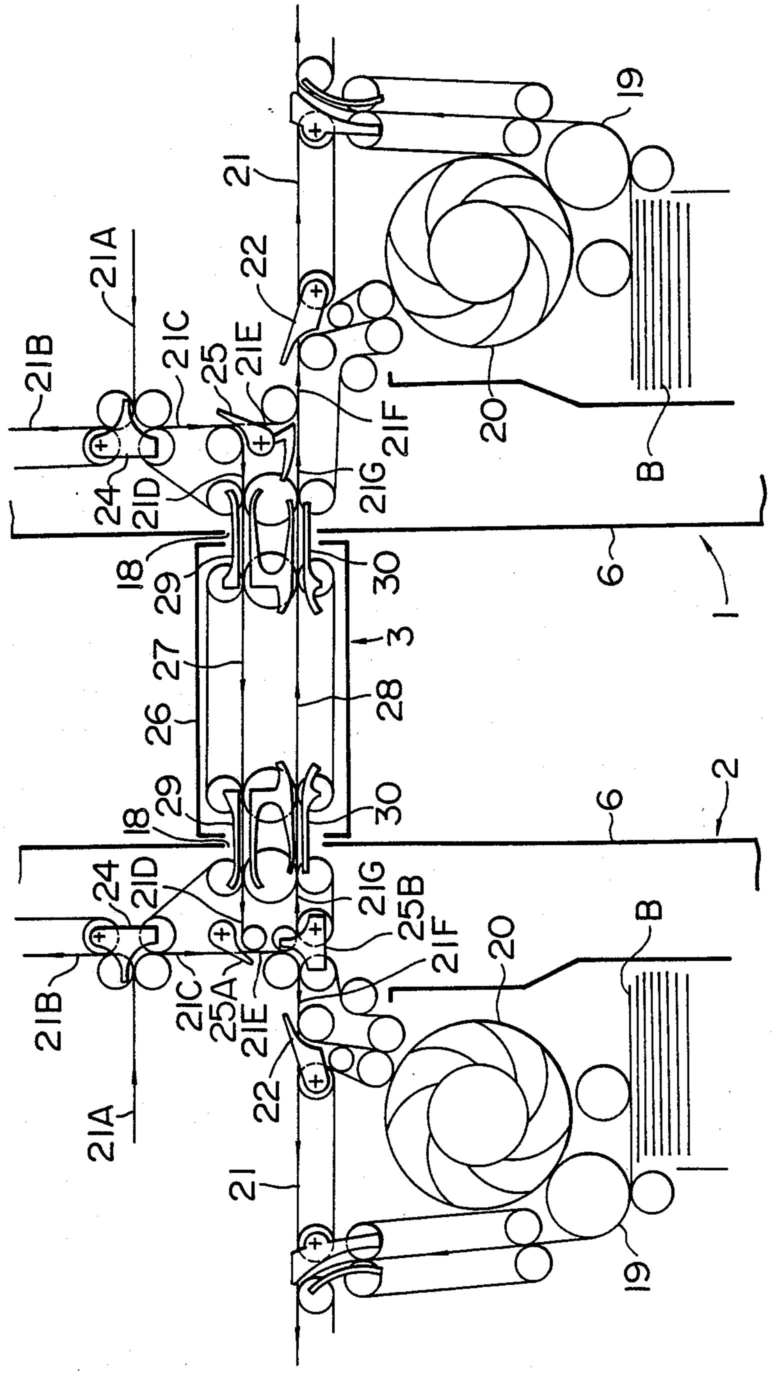
FIGS. 3 and 4 both illustrate modifications of the bill exchange means.

In the above-described embodiment, in order to make the structures of the branch conveyors 23 of transaction machines 1 and 2 employ the same structure 23, the conveying passages 27 and 28 are crossed at their mid points. However, conveying passages 27A and 28A in the bill exchange device 3 may be made parallel by, for example, providing a first gate 25A and a second gate 25B in the branch conveyor 23 of the transaction machine 2, as shown in FIG. 3.

The bill exchange device 3 of the first embodiment is fixedly secured to the rear sides of the transaction machines 1 and 2 at both ends. However, it may also be fixed at only one end while the other end may be connected to the transaction machine by inserting the same thereinto. Alternatively, both ends of the bill exchange device 3 may be detachably inserted into the transaction machines. With this arrangement, attachment of the bill exchange device 3 to the transaction machines 1 and 2 can be improved in addition to the effects attained by the transaction system of the first embodiment.

Figure 4:
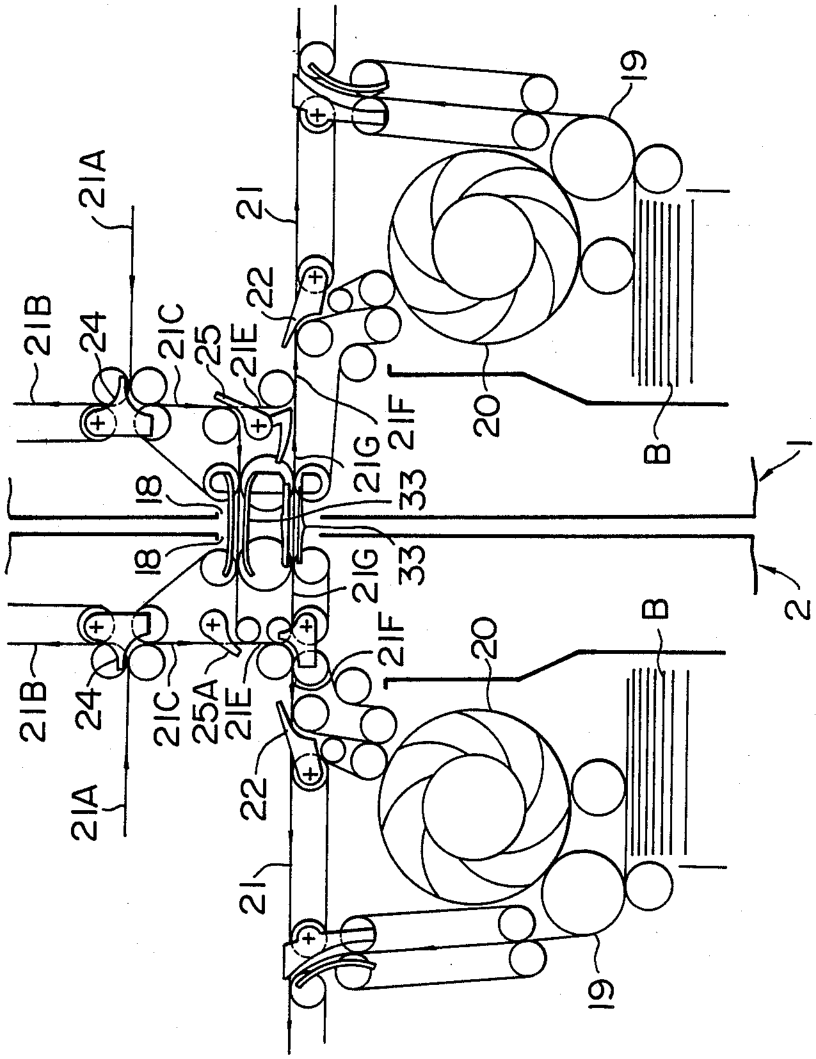

The bill exchange device 3 of the first embodiment is provided between the rear sides of the transaction machines 1 and 2. As shown in FIG. 4, it may be detachably secured to the transaction machines by mounting one end of guide bodies 33 onto the branch conveyor 23 of the transaction machine 1 and the other end thereof to the branch conveyor 23 of the transaction machine 2 through the windows 18 of the transaction machines 1 and 2. This arrangement requires no space for mounting the bill exchange device between the rear sides of the transaction machines. This can therefore make the area of installation of the transaction system smaller, in addition to the above described effects attained by the transaction system of the first embodiment.

Figure 5:
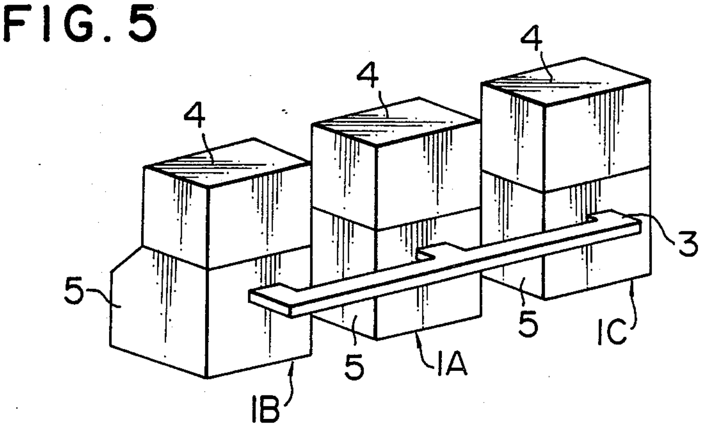
FIG. 5 shows the construction of a second embodiment of a transaction system according to the present invention.
Figure 6:
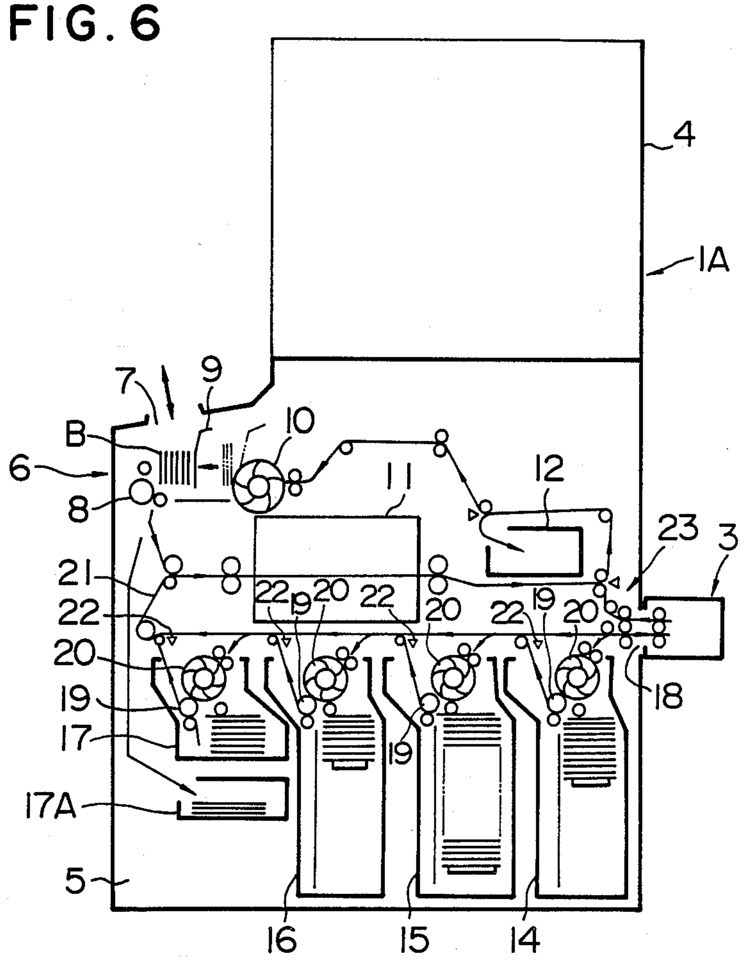
FIG. 6 shows the bill handling sections of the transaction machines employed in the transaction system shown in FIG. 5.
Figure 7:
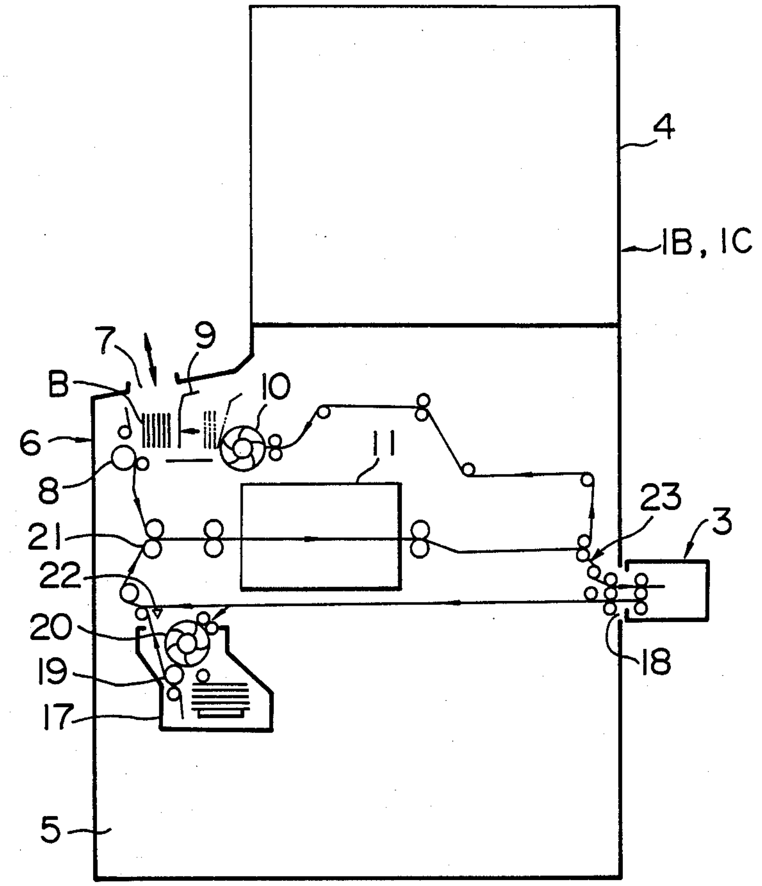
FIG. 7 shows the bill handling sections of the transaction machines employed in the transaction system shown in FIG. 5.

Referring to FIG. 5 which shows a second embodiment of the present invention, reference numerals 1A, 1B and 1C denote transaction machines capable of accepting deposits from and paying out money to customers. The transaction machines 1A, 1B and 1C are disposed in side by side, and are connected by bill exchange device 3 for exchanging bills B among the transaction machines 1A, 1B and 1C. The bill exchange device 3 is adapted to convey the bills B which have been separated one by one in, for example, one transaction machine 1A to another transaction machine 1B or 1C which requires them so as to supply bills to the transaction machine 1B or 1C. The bill exchange device 3 and the transaction machines 1A, 1B and 1C may be constructed in the following manner. The transaction machines 1A, 1B and 1C are each constructed with a slip and bankbook printing section 4 and a bill handling section 5. As shown in FIG. 6, the bill handling section 5 of the transaction machine 1 has at the front side of its body 6 a port 7 through which bills are received and paid out. The bill handling section 5 also includes at one side of the port 7 a separator 8 for accepting deposited bills B and at the other end of the port 7 a pushing portion 9 for forcing out the bills B to be paid to the port 7. At the pushing portion 9 is provided an accumulator 10 for accumulating the bills B to be paid out. At the center of the body 6 is a discriminator 11 which discriminates the genuineness and number of bills B which have been received or will be paid out, which will be supplied or have been retrieved or which is exchanged between either one of the transaction machines 1B and 1C. The bill handling section 5 also includes in its body 6 at the rear of the discriminator 11 a reject box 12 for retrieving the indiscriminatable bills B. At the lower portion of the body 6 are a bill box 14 for bills B, a first bill box 15 for containing bills to be recycled, a second bill box 16 for containing bills to be recycled, a pre-stacker 17 for temporarily storing the bills B which have been received, and a box 17A for retrieving bills which have been left behind, the box 17A being disposed below the pre-stacker 17. The bill boxes 14, 15 and 16 and the pre-stacker 17 are disposed in the body 6 from its rear side in this order. The bill box 14, the first bill box 15, the second bill box 16 and the pre-stacker 17 each have at their upper portions a separator 19 for separating bills B when they are discharged therefrom as well as an accumulator 20 for accumulating bills B. These components described above are interconnected through a conveying means 21 which has gates 22 at the junctions thereof. Part of the conveying means 21 which is located between the bill box 14 and the reject box 12 constitutes a branch conveyor 23 through which bills are exchanged with other transaction machines The branch conveyor 23 faces at the end thereof a window provided at the rear side of the body 6. The bill handling section 5 of the transaction machines 1B or 1C is, as shown in FIG. 7, constructed with a part of components which constitute the bill handling section 5 of the transaction machine 1A, i.e., a port 7, a separator 8, a pushing portion 9, an accumulator 10, a discriminator 11, a prestacker 17, a separator 19, an accumulator 20, a conveying means 21 which interconnects these components, gates 22, a branch conveying passage 23, and a window 18.

Figure 8:
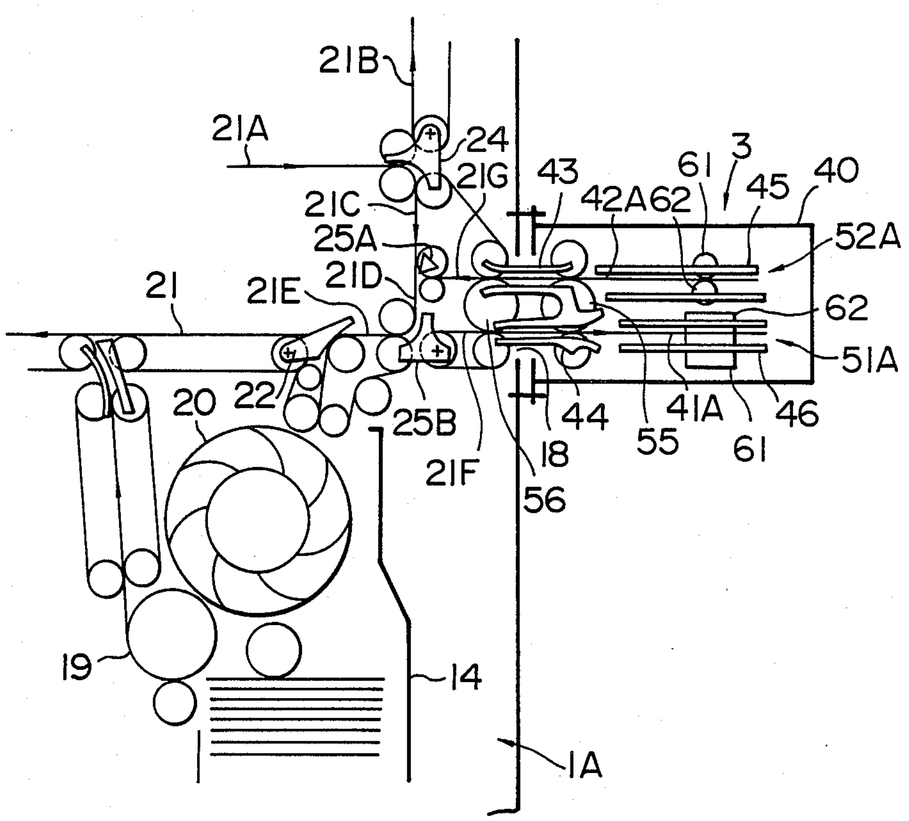
FIGS. 8–10 show the bill exchange means in the transaction system of FIG. 5.
Figure 9:
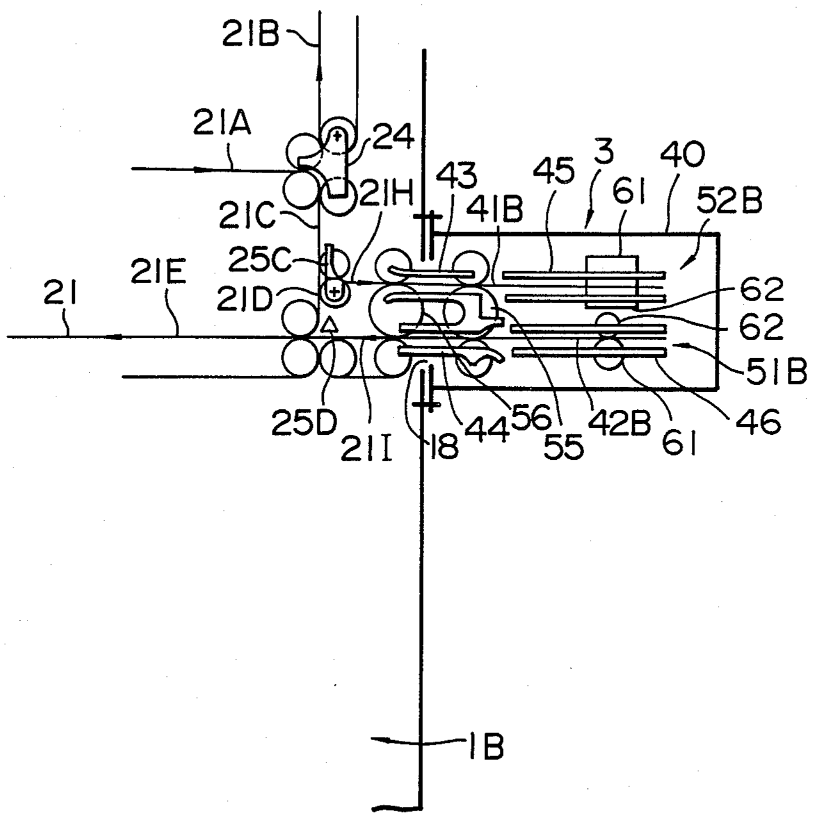

As shown in FIG. 8, the branch conveyor 23 of the transaction machine 1A includes: a first switch-over gate 24 which switches over the bills B which have been conveyed from the discriminator 11 through a conveying means 21A to either a conveying means 21B which leads to the port 7 or to a conveying means 21C which leads to the bill box 14; a guide 25A for introducing the bills B which have been switched over to the conveying means 21C by the first switch-over gate 24 and those which have been conveyed from either of the transaction machines 1B and 1C through a conveying means 21G to a conveying means 21D which leads to the bill box 14; and a second switch-over gate 25B which switches over the bills B which have been conveyed by the conveying means 21D to either a conveying means 21E which leads to the bill box 14 or to a conveying means 21F which leads to the transaction machine 1B or 1C. The first and second switch-over gates 24 and 25B are switched over by a drive means not shown. The branch conveyor 23 of the transaction machine 1B or 1C, as shown in FIG. 9, includes; a first switch-over gate 24 which switches over the bills B which have been conveyed from the discriminator 11 through a conveying means 21A to either a conveying means 21B which leads to the port 7 or a conveying means 21C which leads to the bill box 14; a second switch-over gate 25C which switches over the bills B which have been switched over to the conveying means 21C by the first switch-over gate 24 to either a conveying means 21H through which the bills B are conveyed to the transaction machine 1A or to a conveying means 21D which leads to the bill box; and a guide 25D which introduces to a conveying means 21E which leads to the bill box 14 the bills B which have been switched over to the conveying means 21D by the second switch-over gate 25C and those which have been conveyed from the transaction machine 1A through a conveying means 21I. The first and second switch-over gates 24 and 25C are switched over by drive means.

Figure 10:
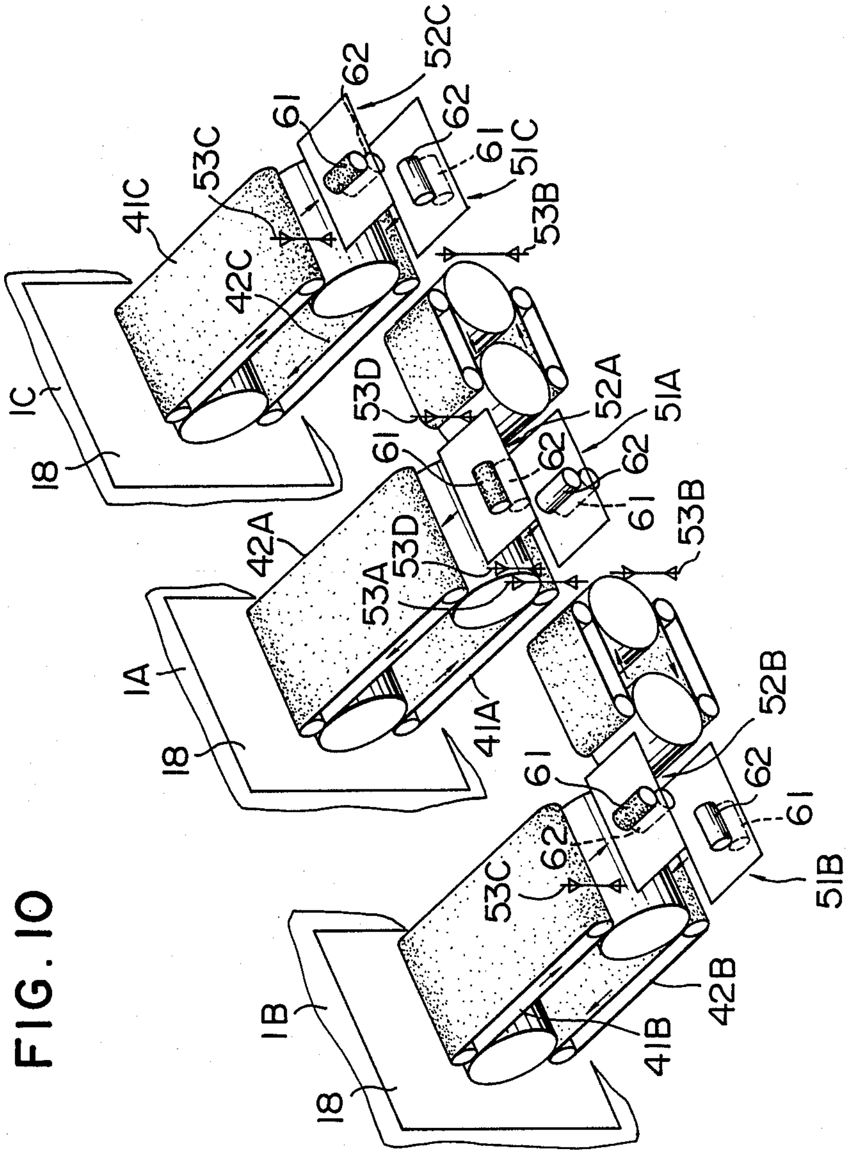

As shown in FIGS. 8 to 10 which show the construction of the bill exchange device 3, a body 40 of the bill exchange device 3 is fixedly secured to the windows 18 provided at the rear of the transaction machines 1A, 1B and 1C by means of bolts. The bill exchange device 3 includes in its body 40 two types of conveying passages 41A, 41B, 41C; and 42A, 42B, 42C through which bills are exchanged among the transaction machines 1A, 1B and 1C. The conveying passages 41A, 41B, 41C; and 42A, 42B, 42C are provided with a plurality of conveying direction changing devices 51A, 51B, 51C, 52A, 52B and 52C which change the direction of conveyance of bills B at right angles so that the bills B are conveyed from either of the transaction machines 1B and 1C to the transaction machine 1A or from the transaction machine 1A to either of the transaction machines 1B and 1C. The ends of the conveying passages 41A, 41B, 41C; 42A, 42B, 42C are respectively coupled to the conveying means 21F, 21G, 21H and 21I of the transaction machines 1A, 1B and 1C through the windows 18 thereof by first and second guides 43 and 44. In the bill exchange device 3, the conveying direction of the bills B which have been conveyed from the conveying means 21F of the transaction machine 1A through the conveying passage 41A are turned at right angle by the first conveying direction changing device 51A and the bills are conveyed through conveying means 53 or 54 and the conveying direction of the bills is turned again by the second conveying direction changing means 51B or 51C, and the bills are conveyed through the conveying means 42B or 42C to either of the transaction machines 1B and 1C. The bills B which have been conveyed from the conveying means 21H of the transaction machines 1B or 1C are conveyed by the conveying means 41B or 41C and the conveying direction thereof is turned by the first conveying direction changing means 52B or 52C and the bills are conveyed by conveying means 55 or 56 and the conveying direction thereof is turned again by the second conveying direction changing means 52A, and the bills are conveyed by the conveying means 42A to the transaction machine 1. Detecting means 53A, 53B, 53C and 53D are disposed ahead of each of the conveying direction changing means 52A, 52B, 51C and 51A at a position of a predetermined interval to detect passage of the bills B.

Construction of the conveying direction changing device 51A will be explained with reference to FIG. 11 to describe that of the conveying direction changing devices 51A, 51B, 51C, 52A, 52B and 52C, since these devices are all constructed in the same manner. The conveying direction changing means 51A comprises a frame 71, a motor 64, a shaft 65 rotatably supported by the frame 71 and being rotated by the motor 64, a rubber roller 66 securely fixed to the shaft 65, a shaft 67 rotatably mounted on the frame 71, a rotary solenoid 70 for pivotaly moving the shaft 67, a metal roller 68 rotatably mounted on the shaft 67 and pressed against the rubber roller 66, a pair of arms 69 fixed to the shaft 67 at one end thereof, a rubber roller 61 rotatably supported by the arms 69 at the other end of the arms 69 and pressed against the metal roller 68, a metal roller 62 rotatably mounted on the frame 71, and control unit for controlling the motor and the actuation of the rotary solenoid 70.

Figure 11:
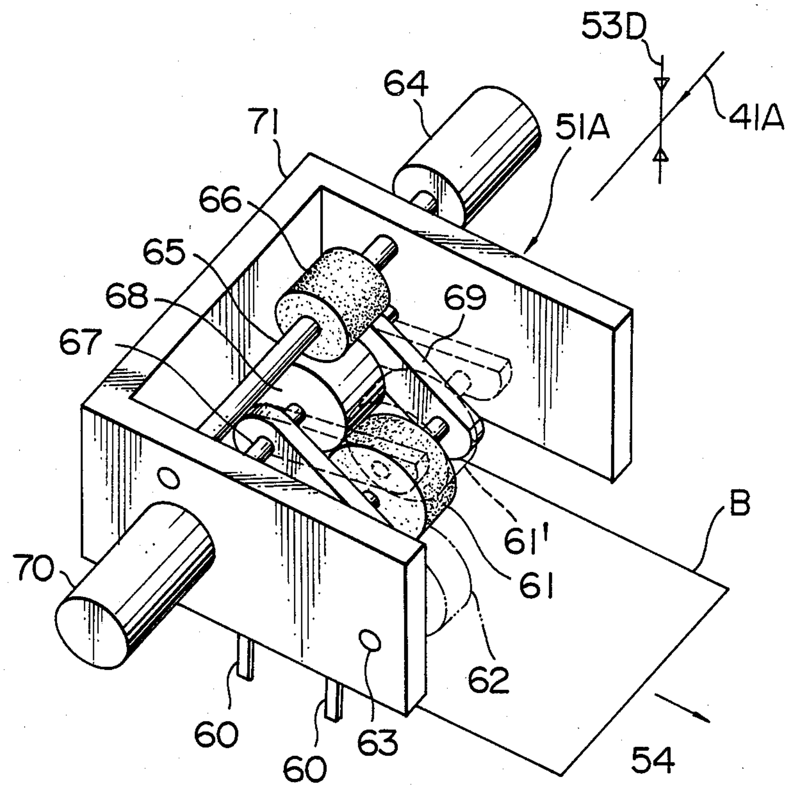
FIG. 11 shows a conveying direction changing device employed in the bill exchange means of the transaction system of FIG. 5.

The arms 69 are positioned in a retired position shown by the dotted line in FIG. 11 thereby a gap being provided between the rubber roller 61 and the metal roller 62 into which the bill can be entered. The passing of the bill through the conveying passage 41A is detected by the detector 53D. In accordance with signal from the detector 53D, the rotary solenoid 70 is actuated, so that the arms 69 are pivotary moved to a position shown in FIG. 11 and the bill is binded between the metal roller 62 and the rubber roller 61. At the same time, the motor 64 is actuated in accordance with the signal from the detector 53D and rotate the rubber roller 66 in the required direction. The rotation of the rubber roller 66 is transferred to the rubber roller 61 through the metal roller 68 which is pressed against the rubber rollers 61 and 66, thereby the bill is conveyed to the required direction. That is, the conveying direction of the bill is turned at right angle.

Figure 12:
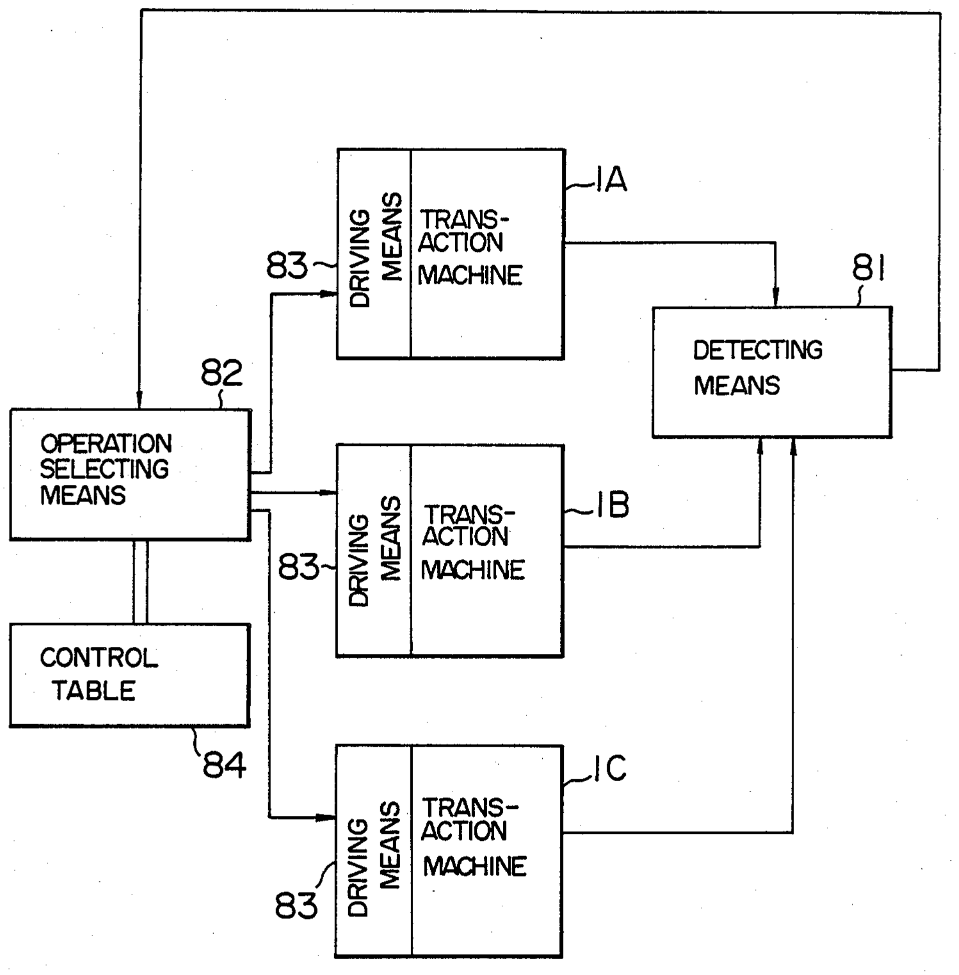
FIG. 12 shows a control circuit employed in the transaction system of FIG. 5.
Figure 13:
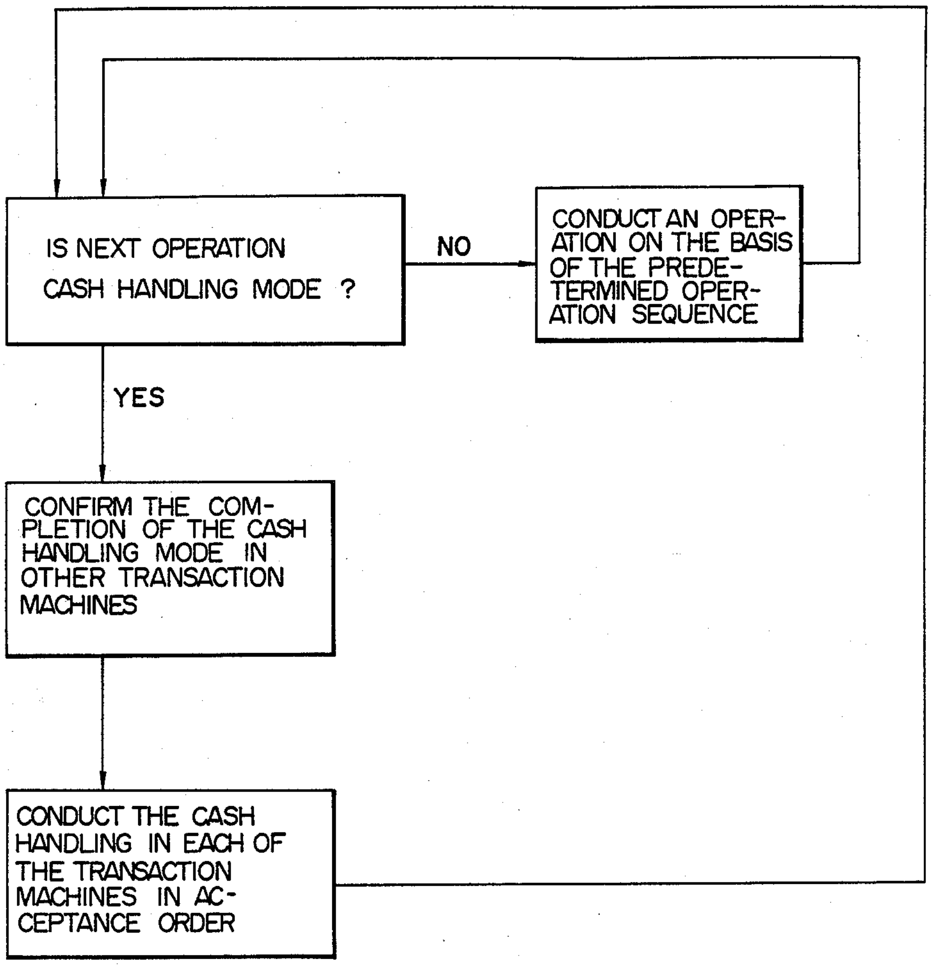
FIG. 13 is a flowchart of the control circuit of FIG. 12.

The transaction machines 1A, 1B and 1C, as shown in FIG. 12, include: a detecting means 81 which detects the time at which transactions are received by each transaction machine as well as the contents of the transactions received by each transaction machine; an operation selecting means 82 which arranges the contents of the transactions detected by the detecting means 81 and determines the contents of the operations of the transaction machines 1A, 1B and 1C as well as the priority of each operation; and drive means 83 which drives the transaction machines 1A, 1B and 1C and the bill exchange means 3 according to the order of the operations as determined by the operation selecting means 82. The operation selecting means 82 has a control table 84 which instructs each transaction machine to conduct any necessary operation items to be conducted before the actual handling of bills at any time, the bill handling operations in the order in which they are received by the transaction machines, and the operation items to be conducted at any time after the completion of the bill handling operation is confirmed. FIG. 13 shows the control flow diagram of this means.

Operation of the transaction system of the second embodiment of the present invention will be described below.

The bills B which have been inserted into the port 7 of the transaction machine 1A, 1B or 1C by a customer are first examined their genuineness. While the counterfeit bills are returned to the port 7 through a conveying means 21B, the genuine ones are temporarily stored in the stacker 17 of the corresponding transaction machine, and are then classified by the type of bill and accommodated in the bill boxes 15 and/or 16 of the transaction machine 1A, thus conducting a deposit accepting transaction. When required by the customers, the bills B accommodated in the first and/or second bill boxes 15 and 16 are paid out through the port 7 of the transaction machine 1A, 1B or 1C.

When the first and second bill boxes of the transaction machine 1A become full of bills B or when they run out of bills B as a result of the transactions described above, the quantities of bills B contained in the bill boxes are detected by sensors, and the surplus bills B in the first and second bill boxes 15 and 16 are separated one by one and accommodated in the bill box 14, or the bills B contained in the bill box 14 are supplied to the first and second bill boxes 15 and 16 to cope with the transactions conducted by customers.

In deposit accepting and paying out transactions through the transaction system, the bill handlings are conducted in the order which the system accepted and the bill handlings in respective transaction machines are conducted after the completion of the previous bill handling so that the bills to be handled in respective transaction machines are not dealt with at the same time in the conveying means 21 and the bill boxes 15 and 16 of the transaction machine 1A which are used commonly by the transaction machines 1A, 1B and 1C. However, the system controls the transaction machines 1A, 1B and 1C to conduct the transactions simultaneously when the handling of bills B is not involved in operation. While a customer is confirming the contents of his transaction in the transaction machine 1A, for example, the transaction machine 1A can also deal with bills B for a transaction conducted by the transaction machine 1B.

The transaction system of the second embodiment of the present invention has a plurality of ports through which customers can transact business with the bank, while the number of bill boxes, reject boxes, retrieved boxes and cash boxes of the system is minimized. This enables the production cost of the transaction system to be reduced and the size thereof to be reduced. It is also possible to increase the efficiency of the use of funds by using a common bill box.

In the transaction system of this embodiment, since the conveying direction of the bills B can be turned at right angles during conveyance, the transaction system can be easily disposed in any form. It may be disposed such that the ports of the transaction machines can be approached from one direction as shown in this embodiment. In this way, customers can be guided to the transaction system smoothly, and maintenance of the transaction system can be carried out from one direction.

Transactions conducted by each transaction machine can be simultaneously dealt with except for the handling of bills, and this can result in a shorter waiting time for customers.

In the transaction system of the second embodiment, the transaction machines each have a discriminator and a pre-stacker for the purpose of reducing the time required for each transaction. The discriminator and pre-stacker, however, may be contained only in the transaction machine 1A so as to reduce the size and production cost of the transaction system.

Thus, the present invention makes it possible to reduce the production cost and size of a plurality of transaction machines constituting the transaction system. The time required for a transaction can also be reduced.

According to the present invention, it is possible to supply and retrieve bills among a plurality of transaction machines, thereby increasing efficiency of the use of funds among the transaction machines.

What is claimed is:

1. An automatic bill transaction system comprising:

a plurality of transaction machines for conducting transactions including one of depositing and disbursing transactions each of said transaction machines includes bill conveying means for conveying bills individually to desired portions provided therein;

bill transfer means for transferring bills individually between said plurality of transaction machines;

connecting means for connecting said bill conveying means of said plurality of transaction machines to said bill transfer means;

detection means for detecting contents of the transactions performed by each of said plurality of transaction machines; and control means for controlling said plurality of transaction machines, said connecting means and said bill transfer means in accordance with the contents of the transactions detected by said detection means.

2. An automatic bill transaction system according to claim 1, wherein said bill transfer means includes conveying passages for conveying bills individually to and from said connecting means.

3. An automatic bill transaction system according to claim 1, wherein one end of said bill transfer means is fixedly secured to one of said transaction machines, while the other end of said bill transfer means is connected to the bill conveying means of another transaction machine by inserting said bill transfer means into said other transaction machine.

4. An automatic bill transaction system according to claim 1, wherein said bill transfer means is fixedly secured to each of transaction machines so that said fill transfer means is connected to said transaction machines at both ends thereof.

5. An automatic bill transaction system according to claim 1, wherein said bill transfer means is connected to each of said transaction machines by detachably inserting each end of said bill transfer means into each of said transaction machines.

6. An automatic bill transaction system according to one of claims 3 to 5, wherein said bill transfer means is provided in such a manner as to connect rear sides of said transaction machines which are disposed with their rear sides facing each other.

7. An automatic bill transaction system according to claim 1, wherein said bill transfer means is provided in a such a manner as to connect rear sides of said plurality of transaction machines which are disposed side by side.

8. An automatic bill transaction system comprising:

a plurality of transaction machines for conducting transactions including one or depositing and disbursing transactions, each of said transaction machines includes bill conveying means for conveying bills individually to desired portions provided therein;

bill transfer means for transferring bills individually between said plurality of transaction machines;

connecting means for connecting said bill conveying means of said plurality of transaction machines to said bill transfer means; and detection means for detecting contents of the transaction performed by each of said plurality of transaction machines;

one of said plurality of transaction machines being made to act as a main transaction machine which includes control means for controlling said plurality of transaction machines, said connecting means and said bill transfer means in accordance with the receipt times and contents of the transactions detected by said detection means.

9. An automatic bill transaction system according to claim 8, wherein:

each of said plurality of transaction machines controlled by said main transaction machine includes a processing section which is operated by a customer and which includes a portion for processing media such as a card and a bankbook, a display portion and a portion for receiving and discharging bills; and said main transaction machine includes in addition to said components constituting said transaction machines controlled by the main transaction machine, a bill processing section for counting and accommodating the bills received and counting and discharging the bills.

10. An automatic bill transaction system according to claim 9, wherein said bill processing section includes a discriminator for counting the bills and storage means for temporarily storing the bills.

11. An automatic bill transaction system according to claim 8, wherein said control means includes operating selecting means for arranging contents of operations of the plurality of transaction machines for the transactions detected by said detection means and for determining order of priority of the operations of the plurality of transaction machines; and drive means for driving said plurality of transaction machines in accordance with the order of priority determined by said operation selecting means.

12. A automatic bill transaction system according to claim 11, wherein said operation selected means has a control table being used to perform operations before bill handling operations of the transaction machines, perform the bill handling operations in the order in which they are received by said transaction machines, and perform operations to be conducted after the bill handling operations.

13. An automatic bill transaction system comprising:

a plurality of transaction machines for conducting transaction including one of depositing and disbursing transactions, each of said transaction machines includes bill conveying means for conveying bills individually to desired portions provided therein;

bill transfer means, communicating with said bill conveying means, for transferring bills individually between said plurality of transaction machines;

detection means for detecting contents of the transactions performed by each of said plurality of transaction machines; and control means for controlling said plurality of transaction machines, and said bill transfer means in accordance with the contents of the transactions detected by said detection means such that a supply of bills in one machine may be accessed by another machine having a depleted supply of bills.

* * * * *